F. H. SCHLEY.
MILKING MACHINE.
APPLICATION FILED SEPT. 24, 1908.

932,585.

Patented Aug. 31, 1909.

WITNESSES
Henry Peterson
Ethel G. Ingraham

INVENTOR
Frank H. Schley
BY
Clem. S. Kimball
ATTORNEY

UNITED STATES PATENT OFFICE.

FRANK H. SCHLEY, OF COUNCIL BLUFFS, IOWA.

MILKING-MACHINE.

932,585.  Specification of Letters Patent.  Patented Aug. 31, 1909.

Application filed September 24, 1908. Serial No. 454,663.

*To all whom it may concern:*

Be it known that I, FRANK H. SCHLEY, a citizen of the United States, residing at Council Bluffs, in the county of Pottawattamie and State of Iowa, have invented new and useful Improvements in Milking-Machines, of which the following is a specification.

My invention relates to an improvement in a machine for milking cows and other animals, which improvement consists of a rotary valve arranged in a main frame in such a manner as to open and close vacuum slots thereby producing a pulsating action, and thereby being able to milk two cows simultaneously.

The objects of my invention are; first, to use a rotary valve arranged in a frame placed upon a milk can from which the air has been pumped, in such a manner as to produce a pulsating action in the tubes attached to the teat cup holders, which produces results in milking somewhat similar to the calf sucking the cow; second, the use of one rotary valve arranged in such a manner as to open the vacuum slots in a device placed upon a milk can from which the air has been pumped, the result being that two cows can be milked simultaneously; third, to provide an improvement upon milking machines which is so simple in its construction and which is made of such material as to prevent the milk from coming in contact with packing or other absorbent substance and drawing it through a non-corrosive and non-contaminating valve; fourth, to provide an improvement upon a milking machine which is simple in its construction, being made up of but four separate pieces and consequently quickly taken apart and easily cleaned. I attain these objects by a device illustrated in the accompanying drawing, consisting of one sheet in which—

Figure 1:
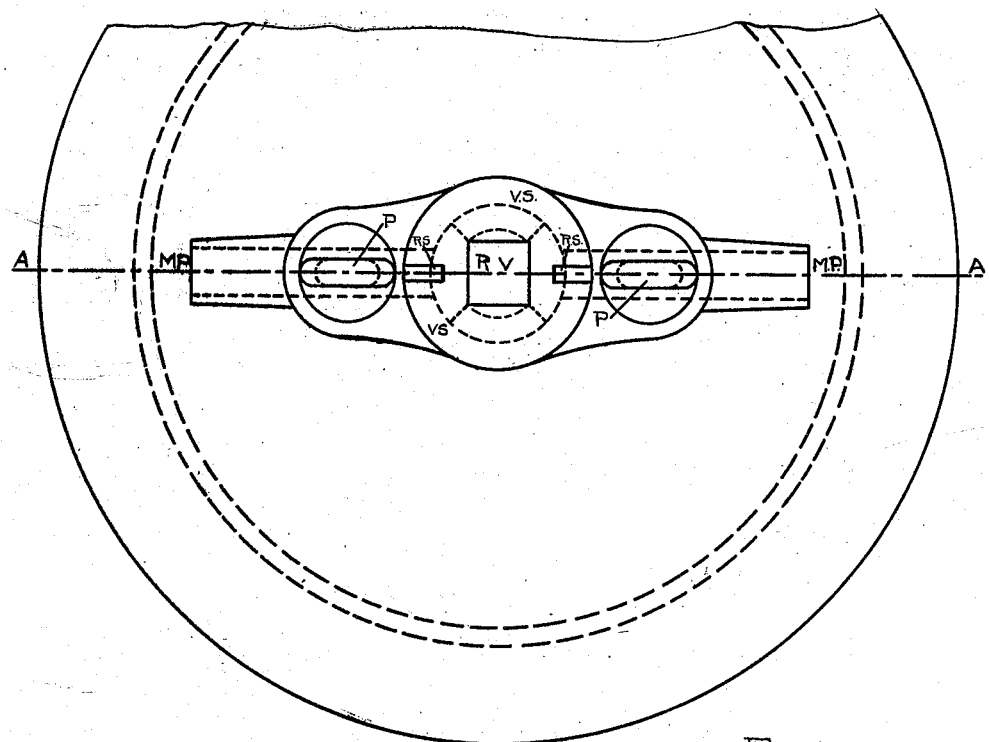
Figure 2:
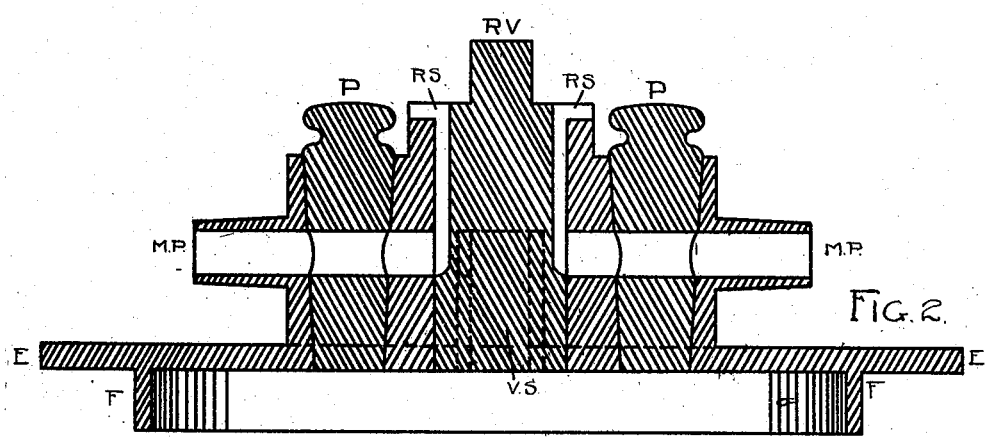

Figure 1 is a top view of the main casting which forms a cover for the milk can. Fig. 2 is a sectional view of the main casting and all its parts taken through the plane AA. Like letters or references refer to like parts in the two figures.

This device consists of but four pieces. The material used in its construction may be any non-corrosive substances.

In the accompanying drawing P and P represent the two cut-off plugs.

RV represent the rotary valve.

RS and RS represent the release slots and VS and VS represent the vacuum slots.

MP and MP represent the passages through which the milk flows from the teat cups through the vacuum slots VS into the can.

E and E represent the plate or frame that rests upon the top of the can.

F and F represent the rim which goes down into the can.

The perforations for the rotary valve RV and for the cut-off plugs P and P are straight or tapered and run directly through the cover into the can so as to drain all leakage and so as to be easily cleaned. The milk passages MP consist of straight holes bored directly through the perforations receiving the rotary valve RV and the cut-off plugs P and P.

In the use of this improvement upon a milking machine, any kind of a milk can made to fit the machine may be used. After the milking machine is placed upon the can the air should be pumped from same by any suitable air pump, thereby forming a vacuum in the can. The milk can with the milk machine, illustrated in the accompanying drawing, is then placed between the two cows and the teat cups attached. Any form of milk tubes may be used between the milk passages MP and MP and the teat cups, the connection being made between the milking machine upon the passages MP and MP with a cow on each side of the machine. The main casting rests upon the top of the vacuum milk can and a rubber gasket is placed around the rim F and F making a tight joint on the vacuum can. The rotary valve RV is made to revolve continuously in the same direction. This valve may be made to revolve by any suitable revolving connection, either in the form of a spring motor, a line shaft or other proper means. When rotary valve RV is in position as in accompanying sketch, the release slots RS and RS allow the air by atmospheric pressure to enter in the rotary valve RV, thence into milk passages MP and MP through the connection through teat cups attached to the cows' teats. When the revolving valve RV is thus made to revolve, vacuum slots VS and VS are brought in connection with milk passages MP and MP and the air which entered into release slots RS and RS is drawn out through these vacuum slots VS and VS into the vacuum milk can, bringing with it by this suction the milk, thus producing the same results as the sucking of a cow by a calf. When milking, the two plugs P and P are turned to allow a continuous flow of milk through passages MP and MP and the plugs P and P to the rotary valve. When not milking, the plugs P and P are turned at right angles to the position shown in the diagram, thus closing the milk passages MP and MP. The fact that the cow is milked dry will be shown when the milk ceases to flow through the transparent milk tubes used in the connection between the milk passages MP and MP and the teat cups.

The rotary valve RV is arranged to fill the perforation through the can cover so that when the vacuum or suction on the milk can is off it can be removed without unscrewing or disconnecting by merely taking it out, likewise the cut-off plugs P and P. The rotary valve has a shoulder or projection which covers the top surface of the perforation into the can thus leaving no space, hole or projection to gather dirt and infection. The cut-off plugs P and P are preferably placed in a tapered perforation through the can cover and are removable in the same manner as the rotary valve RV. Upon removal of the rotary valve or cut-off plug P the perforations may be easily cleaned, being smooth on their inner surface. The milk passages MP, being straight holes intersecting the perforations through the can cover, are also easily swabbed or brushed out, the rotary valve RV having no holes but slots upon its surface enable the same to be easily washed; facility for cleaning these parts being an essential feature of this class of apparatus.

I claim:—

1. In a milking machine, the combination of a can cover having a cylindrical perforation leading into the can, one or more straight passages connecting with said cylindrical perforation, a removable rotary valve arranged to close and fill the said cylindrical perforation, slots upon the surface of said rotary valve arranged to alternately open and close said passages leading from said perforation to the can and to the outside of the can.

2. In a milking machine, the combination of a can cover having a cylindrical perforation leading into the can, one or more straight passages connecting with said cylindrical perforation, a removable rotary valve arranged to close and fill the said cylindrical perforation, slots upon the surface of said rotary valve arranged to alternately open and close said passages leading from said perforation to the can and to the outside of the can, and removable cut-off plugs in said straight passages leading to said cylindrical perforation.

3. In a milking machine, the combination of a can cover having a cylindrical perforation leading into the can, one or more straight passages connecting with said cylindrical perforation, a removable rotary valve arranged to close and fill the said cylindrical perforation, slots upon the surface of said rotary valve arranged to alternately open and close said passages leading from said perforation to the can and to the outside of the can, and perforations through said straight passages into the said can to receive cut-off plugs.

4. In a milking machine, the combination of a can cover having a cylindrical perforation leading into the can, one or more straight passages connecting with said cylindrical perforation, a removable rotary valve arranged to close and fill the said cylindrical perforation, slots upon the surface of said rotary valve arranged to alternately open and close said passages leading from said perforation to the can and to the outside of the can, and said passages into said cylindrical perforation through said can cover having projections adapted to receive hose connections attached to said can cover.

FRANK H. SCHLEY.

Witnesses:
C. C. CLIFTON,
HENRY PETERSON.